United States Patent

Mingus

[15] 3,693,232
[45] Sept. 26, 1972

[54] APPARATUS FOR ASSEMBLING ELONGATED COMPONENTS IN SIDE-BY-SIDE RELATION

[72] Inventor: Alex W. Mingus, P.O. Box 291, Hines, Oreg. 97738

[22] Filed: Dec. 15, 1970

[21] Appl. No.: 98,401

[52] U.S. Cl. ............................. 29/211 R, 29/200 A
[51] Int. Cl. .......................... B23q 7/10, B23p 19/00
[58] Field of Search. 29/200 A, 211 R, 200 R, 211 D, 29/208 D

[56] References Cited

UNITED STATES PATENTS 3,399,445  9/1968  Carroll ..................... 29/211 R
3,537,168  11/1970  Carroll ..................... 29/208 D Primary Examiner—Thomas H. Eager
Attorney—Clarence A. O'Brien and Harvey B. Jacobson

[57] ABSTRACT

A conveyor for engaging and stripping components from successive bottom discharge vertical magazines or feed hoppers spaced longitudinally along the conveyor by engaging the bottom component of the first magazine, conveying the first engaged component toward assembled engagement with the bottom component of the second magazine and displacing the assembled first and second components toward the discharge end of the conveyor assembly.

13 Claims, 8 Drawing Figures

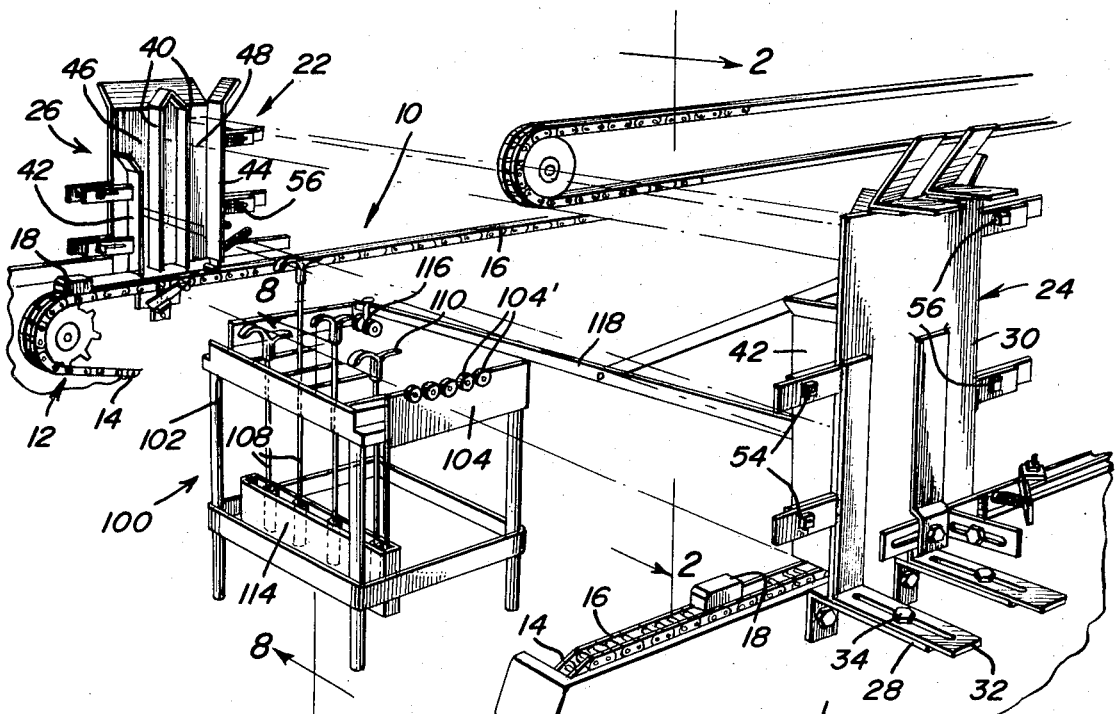
Fig. 1
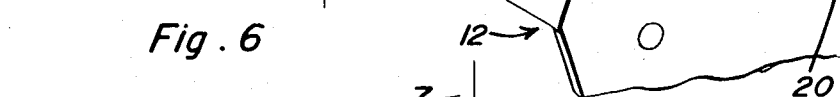
Fig. 6
Alex W. Mingus
INVENTOR.
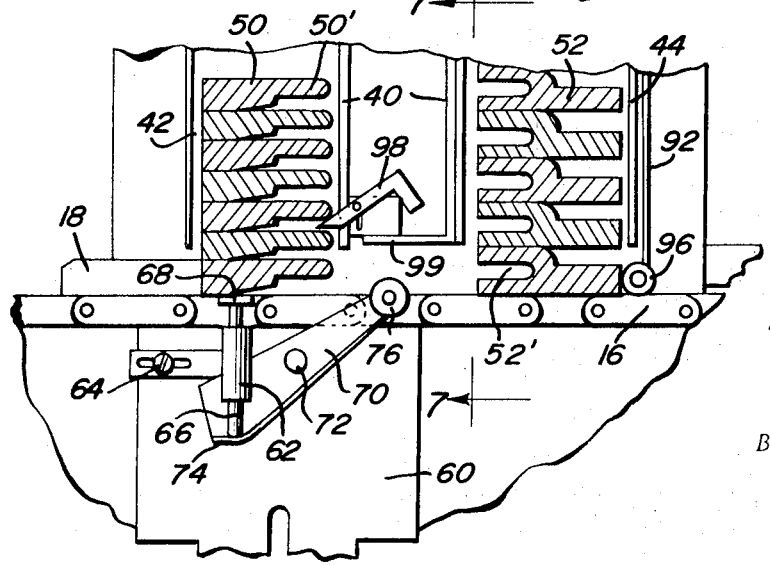

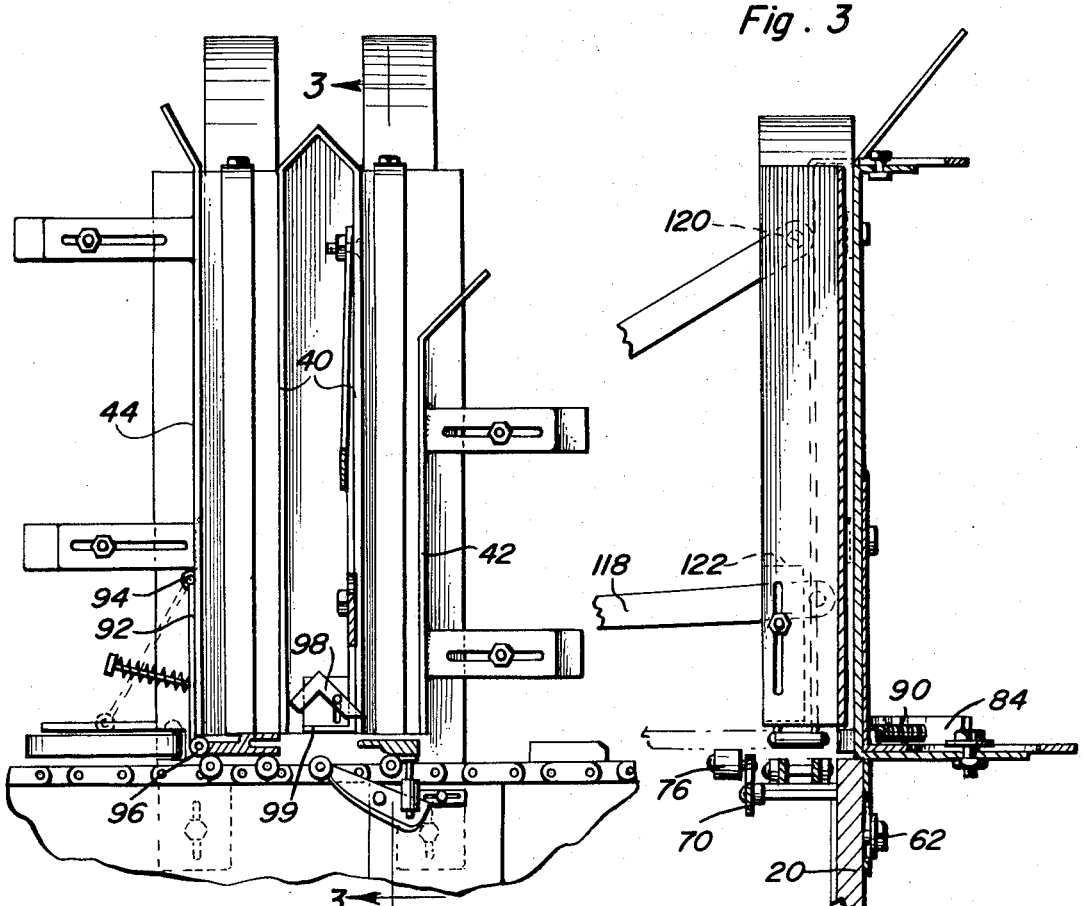

Alex W. Mingus
INVENTOR.

ns
3,693,232

APPARATUS FOR ASSEMBLING ELONGATED COMPONENTS IN SIDE-BY-SIDE RELATION

The hopper feed inserter has been primarily designed for assembling the two components of a two piece door jam and conveying the assembled components to a double end tenoner machine. A pair of generally parallel endless conveyor tracks having horizontally spaced apart upper reaches are provided and a pair of vertically disposed feed hoppers or magazines are spaced longitudinally of these upper reaches and adapted to receive the opposite ends of a pair of vertical stacks of unassembled two-piece door jam components extending between the upper reaches of the endless conveyors members. The endless conveyor members are driven at the same linear speed and include stripping lugs spaced longitudinally therealong which project upwardly from the upper reaches of the endless conveyor members for initial engagement with the opposite ends of the lowermost door jam component supported from the first hopper or magazine. As the lowermost first component is engaged it is stripped from the lower end of the first hopper and horizontally laterally shifted toward the second hopper for engagement and assembly with the lowermost second door jam component supported therein and subsequent stripping of the lowermost second door jam component from the second hopper or magazine whereby the assembled first and second components are thereafter moved as a unit along the upper reach toward the associated double end tenoner machine. Of course, as the lowermost components in the first and second hopper or magazines are stripped from the lower ends thereof, the stacks of first and second components in the magazines drop a distance equal to the vertical thickness of the first and second components stripped from the magazines and thus the next lowest components are automatically positioned for engagement by the next pair of abutment lugs of the upper reaches to be registered with the hoppers or magazines.

The hopper feed inserter of the instant invention therefore enables a single workman to cause first and second components of a two-piece door jam to be assembled and conveyed to a remote location for further processing. The single workman need only be capable of maintaining the two hoppers or magazines of the hopper feed inserter with a supply of door jam components to be assembled. Further, although the ultimate speed of operation of the hopper feed inserter is limited, its structure is such that relatively fast machine operation can be accomplished to the extent that the production of a single workmen maintaining the hopper or magazines with a supply of two-piece door jam components will net a production of assembled door jams far in excess of the ability of a single workman manually assembling the door jams.

Although the hopper feed inserter has been designed for specific use in assembling two-piece door jams, it may also be utilized to assemble other multiple component assemblies. Further, if the door jam components to be assembled are of greater than minimal length, a central support is provided for disposition between the opposite sides of the hopper or magazines which receive the ends of the components to be assembled and serves the purpose of supporting the intermediate portions of the components so that the latter do not sag and become misaligned for proper assembly.

The main object of this invention is to provide an apparatus capable of assembling elongated door jam structures in side-by-side relation.

Another object of this invention, in accordance with the immediately preceding object, is to provide an apparatus operable to convey the assembled components to a remote location for further processing by additionally machinery such as a tenoner machine.

Yet another object of this invention is to provide an apparatus operable to properly align the assembled components for proper indexing into the associated tenoner machine.

Another important object of this invention is to provide an apparatus constructed in a manner whereby it may be readily adapted to receive components of different transverse widths.

A final object of this invention to be specifically enumerated herein is to provide an apparatus in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and ,and in which:

FIG. 1 is a perspective view of the hopper feed inserter of the instant invention with portions of the conveyor assemblies thereof broken away;

FIG. 2 is an enlarged fragmentary vertical sectional view taken substantially upon the plane indicated by the section line 2—2 of FIG. 1;

FIG. 3 is a fragmentary vertical sectional view taken substantially upon the plane indicated by the section line 3—3 of FIG. 2;

FIG. 4 is a top plan view of the assembly illustrated in FIG. 2;

FIG. 5 is a fragmentary enlarged vertical section view illustrating the manner in which the second to be engaged door jam component has its movement along the conveyor assemblies yieldingly retarded to insure full assembly of the first engaged component with the second engaged component;

FIG. 6 is a fragmentary enlarged vertical sectional view similar to FIG. 2 but of the opposite side hopper or magazine construction;

Figure 7:
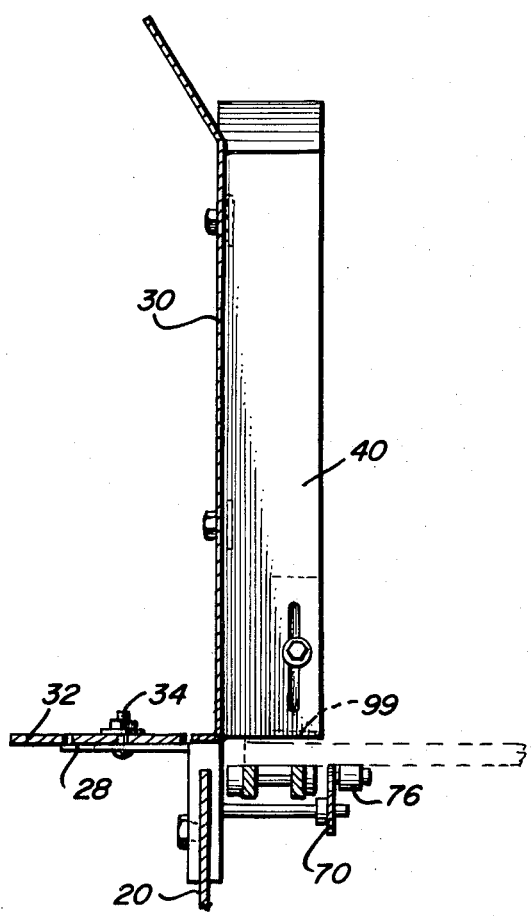
FIG. 7 is a fragmentary vertical sectional view taken substantially upon the plane indicated by the section line 7—7 of FIG. 6.
Figure 8:
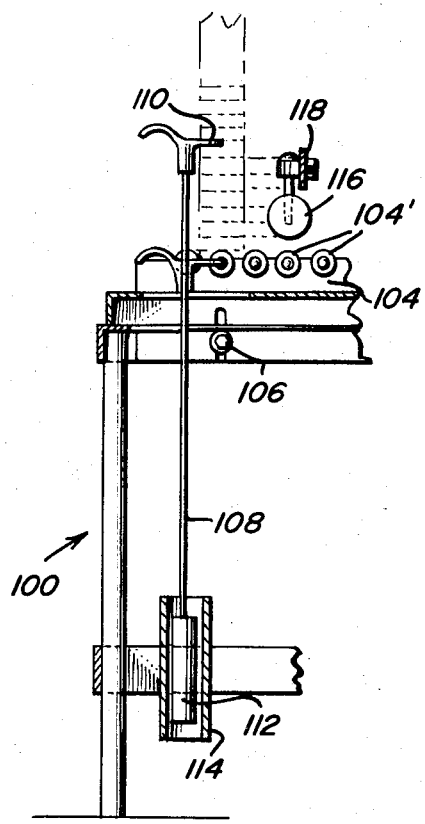
FIG. 8 is an enlarged vertical sectional view taken substantially upon the plane indicated by the section line 8—8 of FIG. 1.

Referring now more specifically to the drawings, the hopper feed inserter is referred to in general by the reference numeral 10 and includes a pair of opposite side longitudinally extending substantially identical but right and left handed conveyor assemblies 12. The conveyor assemblies 12 includes endless conveyor chains 14 including upper reaches 16 and the chains 14 are provided with corresponding transversely aligned longitudinally spaced abutment lugs or blocks 18.

Each of the conveyor assemblies 12 includes a side wall 20 and the hopper feed assembly 10 includes a double hopper or magazine assembly referred to in general by the reference numeral 22. The hopper or magazine assembly 22 includes right and left hand sections referred to in general by the reference numerals 24 and 26 and which are substantially identical, except for being right and left handed.

Each section 24 and 26 includes a pair of mounting brackets 28 secured to the corresponding side wall or mounting panel 20. Also, each section 24 and 26 includes an upstanding mounting plate 30 including horizontally outwardly projecting slotted legs 32 adjustably secured to the corresponding mounting brackets 28 by means of fasteners 34. In this manner, the mounting plates 30 may be shifted toward and away from each other and laterally of the conveyor assemblies 12.

Each of the mounting plates 30 includes a pair of upstanding dividing flanges 40 whose upper ends are convergent and secured together. In addition, each of the sections 24 and 26 includes a pair of first and second upstanding width gauge flanges 42 and 44 spaced in advance of and downstream from the corresponding flanges 40. Thus, each section 24 and 26 defines first and second upstanding grooves or pockets 46 and 48 to receive the corresponding ends of a pair of stacks of first and second door jam components 50 and 52, respectively. The flanges 42 and 44 are supported from the corresponding mounting plates 30 as at 54 and 56, respectively, for individual shifting longitudinally of the conveyor assemblies 12, whereby the width of the grooves 46 and 48 may be varied according to the transverse width of the components 50 and 52.

As may be seen from FIG. 6 of the drawings, each of the sections 24 includes a lower mounting plate portion 60 secured to the corresponding side wall or mounting plate 20 in adjusted vertically shifted position by means of a fastener 62, see FIG. 3. A guide sleeve 62 is slidably supported from each mounting plate portion 60 as at 64 and each sleeve has a lift pin 66 slidably disposed therethrough. Each pin 66 includes a diametrically enlarged upper end head 68 and a lever 70 is pivotally supported from each mounting plate portion 60 as at 72 and includes a lift flange 74 at one end engaged with the lower end of the corresponding pin 66 and a roller 76 as its other end for a purpose to be hereinafter more fully set forth. Still further, the right mounting plate portion 30 includes a horizontal support arm 80 supported therefrom as at 82 for adjustable shifting longitudinally of the conveyor assembly 12. The end of the support arm 80 extending in the direction of movement of the corresponding upper reach 16 has an adjustable abutment arm 84 secured thereto for angular adjustment relative to the support arm 80. In addition, the right mounting plate 30 has a hinged kicker plate 86 pivotally secured thereto as at 88 and a compression spring 90 is interposed between the kicker plate 86 and the corresponding abutment arm 84 whereby the free end of the kicker plate 86 is urged inwardly so as to properly align the corresponding ends of the components 50 and 52 as they are advanced from the hopper or magazine assemblies 22. Also, each of the flanges 44 has a hinged and spring urged component retarding arm 92 supported therefrom as at 94 and provided with a roller 96 and its free end positioned to backup each component 52 before it is stripped from the bottom end of the stack of components 52 disposed in the grooves 48.

Finally, each of the mounting plates 30 includes a small pivoted separator bell crank 98 and a vertically adjustable hold-down shoe 99. The bell cranks 98 include free end portions disposed above the opposite ends of the second from the bottom component 50 which keep the latter from rolling upward during stripping or displacement of the lowermost component 50 from the grooves 46. The hold-down shoes 99 are disposed above the rollers 76 carried by the lever 70 and serve to guide the movement of the lowermost component 50 toward the lowermost component 52, as will be hereinafter more fully set forth.

A center support assembly is provided between the conveyor assemblies 12 and is generally referred to by the reference numeral 100. The support assembly 100 includes an upstanding framework 102 from which a pair of roller equipped opposite side plates 104 are supported for vertical adjustment as at 106. A plurality of upstanding rigid tension members 108 have lifthook equipped horizontally directed pressure heads 110 supported from their upper ends and their lower ends include vertically elongated weights 112 slidably received in a tubular guide 114 carried by a lower portion of the framework 102. The pressure heads are engageable between pairs of superposed components 50 at different elevations so as to maintain the center portions of the components 50 in surface-to-surface stacked relation horizontally registered with the opposite ends of the components 50. In addition, a double wheeled dolly 116, see FIG. 1, is supported from the free end of a support arm 118 mounted on the mounting plate 30 of the section 24 as at 120 and 122. The dolly 116 is centered over the support assembly 100 and bears downwardly upon the center portion of the lowermost component 50 as it is withdrawn from the bottom of the stack of components 50 and laterally shifted toward engagement and assembly with the lowermost component 52.

In operation, a stack of the components 50 have their opposite ends disposed in the grooves 46 of the sections 24 and 26 and a stack of the components 52 have their opposite ends disposed in the grooves 48 of the sections 24 and 26. The bell cranks 98 prevent upward swinging movement of the opposite ends of the leading edge portion of the second from the bottom component 50 and the under surface portions of the opposite ends of the lowermost component 50 rest upon the heads 68 of the pins 66. The under surfaces of the central portions of both lowermost components 50 and 52 rest upon the rollers 104' carried by the vertically adjustable side plates 104 of the support assembly 100 and the rollers 96 are engaged with the opposite ends of the leading edge of the lowermost component 52. Then, upon operation of the conveyor assemblies 12, the upper reaches 16 advance along the conveyor assemblies 12 so that a pair of corresponding abutment blocks 18 engage the opposite ends of the trailing edge of the lowermost components 50 and urge the latter laterally in a forward direction toward the lowermost component 52. As the opposite ends of the lowermost component 50 move forwardly, they engage the roller 76 and depress the latter in order to effect upward movement of the corresponding pins whereupon the heads 68 are shifted to raised positions for receiving the opposite ends of the stack of components 50 thereon after the lowermost component 50 has been withdrawn from beneath the stack of components 50. Of course, the opposite ends of the component 50 engaged by the lugs 18 pass beneath the shoes 99 and the tongue portion 50' of the component 50 being advanced is received in the groove 52' of the lowermost components 52 while the rollers 96 bear rearwardly on the opposite ends of the leading edge of the lowermost component 52. As soon as the tongue 50' of the component 50 being conveyed is fully seated in the groove 52', the lowermost component 52 is stripped or laterally shifted from the lower end of the stack of components 52 disposed in the grooves 48. The right end edges of the assembled components 50 and 52 being conveyed are engaged by the kicker plate 86 for proper centering of the components 50 and 52 on the conveyor assemblies 12.

The support assembly 100, as hereinbefore set forth, supports the mid-portions of the stacks of components 50 and 52 from the rollers 104' and the heads 110 bear downwardly upon vertically spaced mid-portion of the stacks of components 50 while the double-wheeled dolly 116 properly guides the center portions of the component 50 being conveyed by the conveyor assemblies 12 during movement of that component 50 toward engagement and assembly with the lowermost component 52.

As will be appreciated by the foregoing description, the hopper feed inserter is adjustable to receive various width components such as the components 50 and 52 and includes multiple guiding structure whereby guiding movement of each component 50 toward the corresponding component 52 is precisely controlled and proper centering of the assembled components 50 and 52 is accomplished as the latter move along the conveyor assemblies 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with two sets of elongated components to be disposed in juxtaposition and conveyed to a remote location, a feed mechanism including a pair of elongated generally parallel conveyors, first and second component support structures spaced along said conveyors with each component support structure including a pair of sections supported adjacent corresponding portions of said conveyors, each pair of support structure sections including means for supporting the opposite ends of a plurality of vertically stacked elongated components extending therebetween and successively feeding the lowermost supported component downwardly toward a discharge position closely adjacent said conveyors in response to a component previously disposed in said discharge position being laterally stripped from said discharge position and advanced along said conveyors from said discharge position, said conveyors including corresponding longitudinally spaced upwardly projecting stripping abutments for engaging the end portions of successive components disposed in said discharge position of the first support structure and stripping successively engaged components and laterally conveying the latter along said conveyors toward and into engagement with successive components disposed in the discharge position of said second support structure for stripping successively engaged components from the discharge position of the second support structure and thereafter conveying the mutually engaged components further along said conveyors.

2. The combination of claim 1 wherein each pair of support structure sections defines a pair of elongated pockets opening laterally toward each other and opening at one pair of corresponding ends toward a plane containing said conveyors.

3. The combination of claim 2 wherein said pockets are disposed upright and said one pair of ends thereof comprise the lowermost ends.

4. The combination of claim 3 wherein the upper ends of said pockets open upwardly for downward feeding of component ends thereinto.

5. In combination, a conveyor system including a portion thereof movable along a predetermined path, first and second of feed mechanisms spaced along said path and each including support and feeding means for supporting a plurality of components therefrom and successively feeding components toward juxtaposition with said conveyor system portion, said conveyor system portion including means spaced therealong operative to engage a component of the first feed mechanism juxtaposition the conveyor portion and strip the engaged component from the first feed mechanism, move the last mentioned component along the conveyor system toward engagement with the second feed mechanism component juxtaposition the conveyor system portion and strip the last mentioned component from the second feed mechanism and thereafter convey the mutually engaged components further along said path.

6. The combination of claim 5 wherein said second feed mechanism includes means for yieldingly resisting at least initial movement of said second feed mechanism component along said path.

7. The combination of claim 1 wherein each pair of support structure sections defines a pair of elongated pockets opening laterally toward each other and opening at one pair of corresponding ends toward a plane containing said conveyors, said support structure sections each including means for adjustably varying the width of the pocket defined thereby.

8. The combination of claim 1 wherein said second component support structure includes means for yieldingly resisting at least initial movement of the component in the discharge position of said second support structure.

9. The combination of claim 1 including a support assembly disposed between said conveyors and including upwardly facing support surface means for supporting the undersurfaces of the midportions of said components in said discharge position.

10. The combination of claim 9 wherein said support assembly includes elongated laterally spaced support members extending longitudinally of said conveyors, said support surface means including portions thereof spaced along said support members.

11. The combination of claim 10 wherein said support members are supported for adjustment laterally of a plane containing said conveyors.

12. The combination of claim 11 wherein said upwardly facing surface portions comprise the upper peripheral portions of rollers journaled from and spaced longitudinally of said support members.

13. The combination of claim 12 wherein said support assembly includes vertically slidable weight members including enlarged upper ends for engagement over the upper surfaces of selected component midportions supported from said rollers.

* * * * *